(12) United States Patent
Jeong

(10) Patent No.: US 9,882,413 B2
(45) Date of Patent: Jan. 30, 2018

(54) WEARABLE DEVICES FOR WIRELESS POWER TRANSFER AND COMMUNICATION

(71) Applicant: QUALCOMM Incorporated, San Diego, CA (US)

(72) Inventor: Seong Heon Jeong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 14/820,216

(22) Filed: Aug. 6, 2015

(65) Prior Publication Data

US 2016/0172890 A1 Jun. 16, 2016

Related U.S. Application Data

(60) Provisional application No. 62/091,117, filed on Dec. 12, 2014.

(51) Int. Cl.
| | |
|---|---|
| *H02J 7/00* | (2006.01) |
| *H02J 7/02* | (2016.01) |
| *H01F 38/14* | (2006.01) |
| *H02J 5/00* | (2016.01) |
| *H04B 5/00* | (2006.01) |
| *H02J 7/04* | (2006.01) |
| *G04C 10/00* | (2006.01) |

(Continued)

(52) U.S. Cl.
CPC ............. *H02J 7/025* (2013.01); *G04C 10/00* (2013.01); *G04G 19/00* (2013.01); *H01F 38/14* (2013.01); *H02J 5/005* (2013.01); *H02J 7/04* (2013.01); *H04B 5/0037* (2013.01); *H04B 5/0087* (2013.01); *G04G 17/00* (2013.01)

(58) Field of Classification Search
CPC ........................................................ H02J 7/025
USPC ........................................................ 320/108
See application file for complete search history.

(56) References Cited

U.S. PATENT DOCUMENTS

| | | |
|---|---|---|
| 6,158,884 A | 12/2000 | Lebby et al. |
| 2005/0020302 A1 | 1/2005 | Ikeda et al. |
| 2008/0298100 A1 | 12/2008 | Esaka et al. |

(Continued)

FOREIGN PATENT DOCUMENTS

| | | |
|---|---|---|
| CN | 202454722 U | 9/2012 |
| CN | 203422610 U | 2/2014 |

(Continued)

OTHER PUBLICATIONS

International Search Report and Written Opinion—PCT/US2015/060396—ISA/EPO—Jan. 27, 2016.

(Continued)

*Primary Examiner* — Edward Tso
*Assistant Examiner* — Ahmed Omar
(74) *Attorney, Agent, or Firm* — Hunter Clark PLLC

(57) ABSTRACT

Disclosed is a wireless charging system for a wearable device having a plurality of coils configured to couple to an externally generated magnetic field and provide power to an electronic component in the wearable device. The coils may include a first coil integrated with a device body of the wearable device and a second coil disposed in a portion of the wearable device that is configured to secure the wearable device to a user. The second coil may have a non-planar contour.

30 Claims, 10 Drawing Sheets

(51) Int. Cl.
*G04G 19/00* (2006.01)
*G04G 17/00* (2013.01)

(56) References Cited

U.S. PATENT DOCUMENTS

| | | | |
|---|---|---|---|
| 2011/0304216 A1* | 12/2011 | Baarman | H02J 17/00 307/104 |
| 2012/0194976 A1 | 8/2012 | Golko et al. | |
| 2013/0005251 A1 | 1/2013 | Soar | |
| 2013/0043734 A1 | 2/2013 | Stone et al. | |
| 2014/0187157 A1 | 7/2014 | Liao | |
| 2014/0232328 A1 | 8/2014 | Pegg | |
| 2014/0375246 A1 | 12/2014 | Boysen, III et al. | |
| 2014/0378853 A1 | 12/2014 | McKinney et al. | |
| 2015/0115726 A1 | 4/2015 | Kang et al. | |
| 2017/0005524 A1* | 1/2017 | Akuzawa | H02J 50/12 |

FOREIGN PATENT DOCUMENTS

| | | |
|---|---|---|
| EP | 2566011 A1 | 3/2013 |
| KR | 20140120786 A | 10/2014 |

OTHER PUBLICATIONS

International Preliminary Report on Patentability—PCT/US2015/060396, The International Bureau of WIPO—Geneva, Switzerland, Jun. 22, 2017.

* cited by examiner

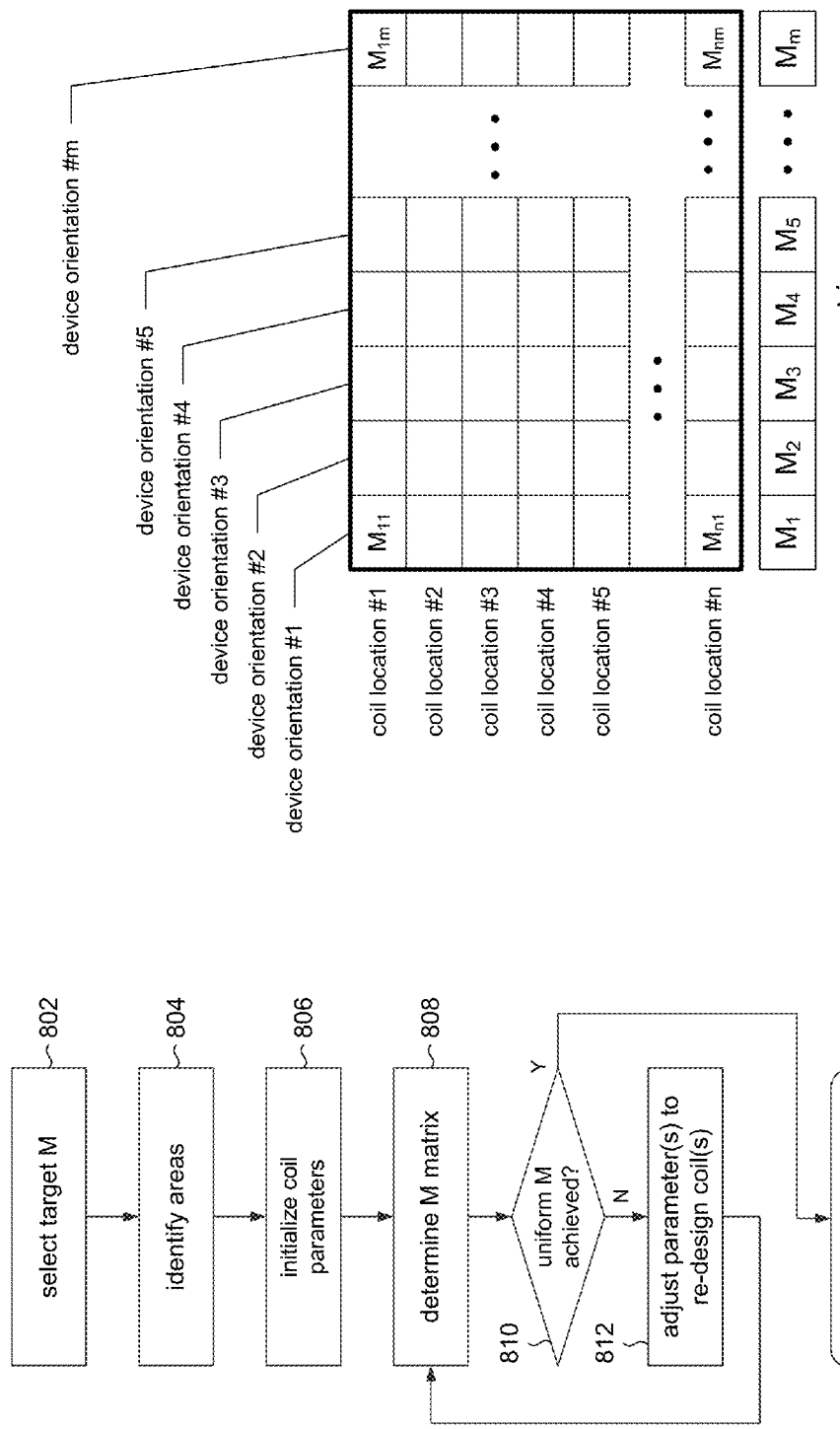

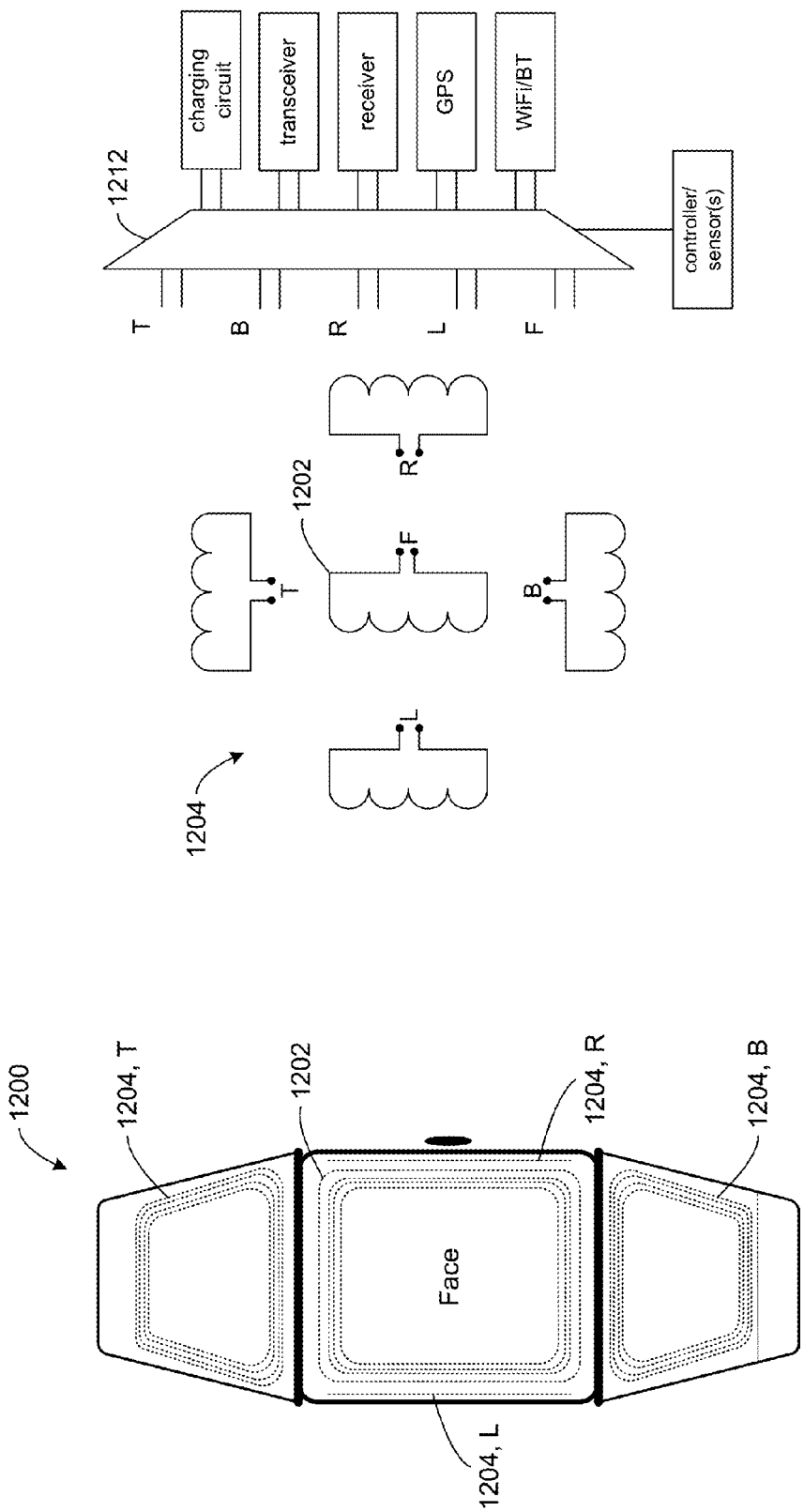

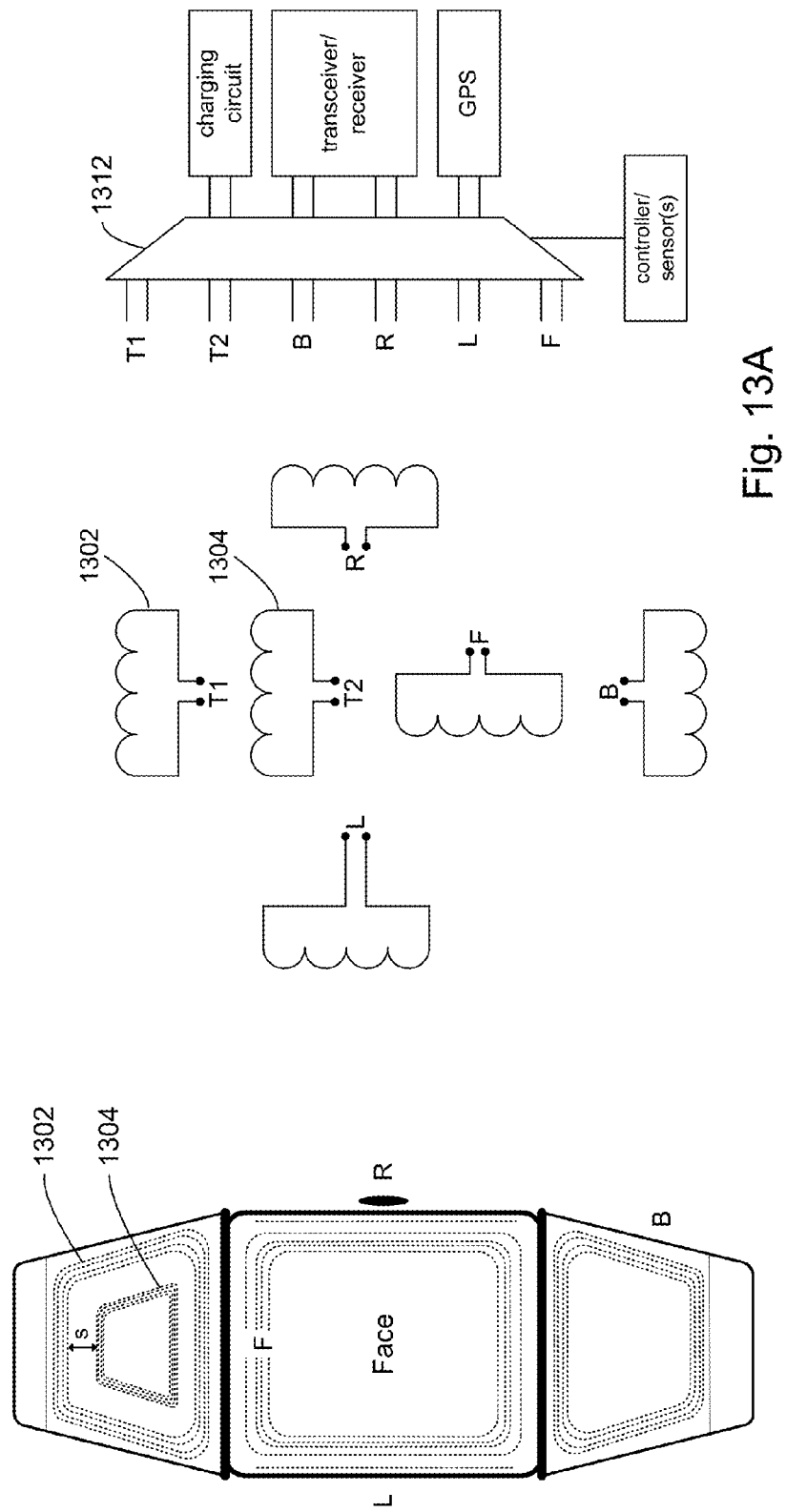

_(10)_ US 9,882,413 B2

WEARABLE DEVICES FOR WIRELESS POWER TRANSFER AND COMMUNICATION

CROSS REFERENCE TO RELATED APPLICATIONS

Pursuant to 35 U.S.C. § 119(e), this application is entitled to and claims the benefit of the filing date of U.S. Provisional App. No. 62/091,117 filed Dec. 12, 2014, the content of which is incorporated herein by reference in its entirety for all purposes.

TECHNICAL FIELD

The present disclosure relates to wireless power transfer, and in particular to wireless power transfer in wearable devices.

BACKGROUND

The market for wearable devices is fast growing and many companies and institutes are developing the devices actively. The challenge for wireless charging on wearable devices (e.g., smartwatches, smart eyewear, health monitors, medical devices, and so on) is that the devices are not generally 2-dimensional (as in a computer tablet, for example) but are typically 3-dimensional in shape. This geometric irregularity makes it beneficial to the design of power receiving elements for such devices configured for wirelessly receiving power (sometimes referred to as a power receiving unit or "PRU") to improve or maintain sufficient mutual inductance (M) while accommodating appropriate M variation.

SUMMARY

In accordance with some aspects of the present disclosure, a wireless charging system for a wearable device may include a plurality of coils configured, in the presence of an externally generated magnetic field, to wirelessly provide power to an electronic component in the wearable device. The plurality of coils may include a first coil integrated with a device body of the wearable device and a second coil integrated with a portion of the wearable device that is configured to secure the wearable device to a user. The second coil may have a non-planar contour. In some aspects, a first plane on which the first coil is wound is substantially orthogonal to a second plane on which the second coil is wound.

In some aspects, a first mutual inductance between the plurality of coils and a transmitter coil that generates the externally generated magnetic field, when the wearable device is in a first orientation within the externally generated magnetic field, may be within 20% of a second mutual inductance between the plurality of coils and the transmitter coil when the wearable device is in a second orientation within the externally generated magnetic field.

In some aspects, the first coil may be perpendicular to a first component of the externally generated magnetic field when the wearable device is in the first orientation, and the second coil may be perpendicular to the first component of the externally generated magnetic field when the wearable device is in the second orientation. As another example, the first coil may not be perpendicular to a first component of the externally generated magnetic field when the wearable device is in the first orientation, and the second coil may not be perpendicular to the first component of the externally generated magnetic field when the wearable device is in the second orientation.

In some aspects, a combined mutual inductance between the plurality of coils and a transmitter coil that generates the externally generated magnetic field may be substantially the same at each of a plurality of orientations of the wearable device within the externally generated magnetic field.

In some aspects, a ratio between a first mutual inductance between the plurality of coils and a transmitter coil that generates the externally generated magnetic field, when the wearable device is in a first orientation within the externally generated magnetic field, and a second mutual inductance between the plurality of coils and the transmitter coil, when the wearable device is in a second orientation within the externally generated magnetic field, may be substantially 1.2.

In some aspects, the system may further comprise a plurality of capacitors, each coil of the plurality of coils electrically may be coupled to a respective one of the plurality of capacitors. In some aspects, each coil and the respective capacitor may form a resonant circuit configured to resonate substantially at a frequency of the externally generated magnetic field.

In some aspects, the electronic component may be a battery charging circuit, a power management circuit, or a combination thereof.

In some aspects, the portion of the wearable device configured to secure the wearable device to a user may be a flexible strap.

In some aspects, the portion of the wearable device configured to secure the wearable device to a user may comprise a first curved segment connected to an end of the device body and a second curved segment connected to an opposing end of the device body. The second coil may be disposed within the first curved segment and a third coil of the plurality of coils may be disposed within the second curved segment.

In some aspects, the plurality of coils may further comprise a third coil disposed on the device body. The first coil and the third coil may be disposed on opposing sides of the device body.

In some aspects, the first coil may be disposed on a face of the device body.

In some aspects, the system may further comprise a plurality of switches electrically connected to the plurality of coils and operative to selectively electrically connect together two or more of the plurality of coils.

In some aspects, the system may further comprise a controller circuit configured to operate the plurality of switches to selectively electrically connect together two or more of the plurality of coils to adjust a mutual inductance between the plurality of coils and a transmitter coil that generates the externally generated magnetic field based on a detected orientation of the wearable device within the externally generated magnetic field.

In some aspects, the wearable device may be a watch, an electronic fitness monitoring device, an electronic bracelet, or an electronic badge.

In accordance with some aspects of the present disclosure, a method to configure a wearable device with a wireless charging system may include selecting a target mutual inductance ($M_{target}$) between a plurality of coils configured to be integrated with the wearable device at a plurality of locations and a transmitter coil configured to generate an externally generated magnetic field. The method may further include determining a plurality of placement orientations of the wearable device in the externally generated magnetic field and determining a total mutual inductance between the plurality of coils and the transmitter coil for each of the plurality of placement orientations. The method may further include changing one or more design parameters of the plurality of coils, and repeating the step of determining total mutual inductance and the changing step until the total mutual inductance for each of the plurality of placement orientations is within substantially 20% of $M_{target}$.

In some aspects, the step of determining total mutual inductance may be based on determining individual mutual inductances between each of the plurality of coils and the transmitter coil for the plurality of placement orientation. The changing step may be repeated until the individual mutual inductances for a given placement orientation of the wearable device in the externally generated magnetic field have an average of substantially $M_{target}$.

In some aspects, repeating the step determining total mutual inductance and the changing step may be repeated until the total mutual inductance for each of the plurality of placement orientations is substantially equal to $M_{target}$.

In accordance with some aspects of the present disclosure, a wireless charging system may include a plurality of coils comprising a first coil integrated with a device body of a wearable device and a second coil integrated with a portion of the wearable device that is configured to secure the wearable device to a user and a plurality of switches electrically connected to the plurality of coils and operative to selectively connect together the plurality of coils in different combinations. The plurality of switches may be operative to electrically connect together the plurality of coils in a first combination comprising the plurality of coils electrically connected together to a first electronic component of the wearable device. The plurality of coils may be configured to couple to an externally generated magnetic field and provide power to the first electronic component. The plurality of switches may be further operative to electrically connect together the plurality of coils in a second combination comprising a subset of the plurality of coils electrically connected together to the first electronic component and at least one of the plurality of coils electrically connected to a second electronic component in the wearable device. The subset of the coils may be configured to couple to the externally generated magnetic field and provide power to the first electronic component.

In some aspects, the subset of the plurality of coils in the second combination may be electrically connected together and configured to couple to the externally generated magnetic field, and at least one of the plurality of coils may be configured as a main communication antenna or a diversity communication antenna.

In some aspects, the main communication antenna or the diversity communication antenna may be used for at least one of LTE communication, UMTS communication, CDMA communication, GSM communication, WiFi communication, Bluetooth communication, GPS communication, or radio communication, or a combination thereof.

In some aspects, at least one of the plurality coils in the second combination may be disposed on a face side of the device body and configured for GPS communication.

In some aspects, the first electronic component may include a battery charging circuit and the second electronic component may include a communication circuit.

In some aspects, the first combination may comprise at least some of the plurality of coils electrically connected together in series or in parallel, or a combination thereof.

In some aspects, the second combination may further comprise another one of the coils electrically connected to a third electronic component in the wearable device.

In some aspects, at least one of the coils may be configured as a main communications antenna. Another one of the coils may be configured as a diversity communications antenna.

In accordance with some aspects of the present disclosure, a wireless charging system for a wearable device may include a plurality of coils disposed on or within different surfaces of the wearable device, wherein at least two of the surfaces are oriented on different planes. The plurality of coils may be configured to couple to an externally generated magnetic field and provide power to an electronic component in the wearable device. A first mutual inductance between the plurality of coils and a transmitter coil configured to generate the externally generated magnetic field, when the wearable device is in a first orientation within the externally generated magnetic field, may be within 20% of a second mutual inductance between the plurality of coils and the transmitter coil when the wearable device is in a second orientation within the externally generated magnetic field.

In some aspects, the system may further include switching circuitry connected to the plurality of coils and configured to selectively connect together different coils of the plurality of coils when the wearable device is in different orientations within the externally generated magnetic field.

In accordance with some aspects of the present disclosure, a wireless charging system for a wearable device includes a plurality of means for coupling to an externally generated magnetic field and providing power to an electronic component in the wearable device. The plurality of coupling means are disposed on or within different surfaces of the wearable device. At least two of the surfaces are oriented on different planes. A first mutual inductance between the plurality of coupling means and a transmitter coil configured to generate the externally generated magnetic field, when the wearable device is in a first orientation within the externally generated magnetic field, may be within 20% of a second mutual inductance between the plurality of coupling means and the transmitter coil when the wearable device is in a second orientation within the externally generated magnetic field.

In accordance with some aspects of the present disclosure, a wireless charging system may include a plurality means for coupling to an externally generated magnetic field and providing power to a first electronic component of a wearable device. The plurality of coupling means comprising a first coupling means integrated with a device body of the wearable device and a second coupling means integrated with a means for fastening the wearable device to a user. The wireless charging system further includes a plurality of means for selectively connecting together the plurality of coupling means in different combinations. The plurality of connecting means may be operative to electrically connect together the plurality of coupling means in a first combination comprising the plurality of coupling means electrically connected together to the first electronic component of the wearable device. The plurality of connecting means may be further operative to electrically connect together the plurality of coupling means in a second combination comprising a subset of the plurality of coupling means electrically connected together to the first electronic component and at least one of the plurality of coupling means electrically connected to a second electronic component in the wearable device. The subset of the plurality of coupling means may be configured to couple to the externally generated magnetic field and provide power to the first electronic component.

In accordance with some aspects of the present disclosure, a wireless charging system for a wearable device may include a plurality of means for coupling to an externally generated magnetic field and providing power to an electronic component in the wearable device. The plurality of coupling means may include a first coupling means integrated with a device body of the wearable device and a second coupling means integrated with a means for fastening the wearable device to a user. The second coupling means may have a non-planar contour.

In accordance with some aspects of the present disclosure, a method for wireless charging a wearable device is disclosed. The method may include wirelessly coupling to an externally generated magnetic field and providing power to an electronic component in the wearable device via a first coil of a plurality of coils, the first coil integrated with a device body of the wearable device. The method may further include wirelessly coupling to the externally generated magnetic field and providing power to the electronic component via a second coil of the plurality of coils, the second coil integrated with a portion of the wearable device that is configured to secure the wearable device to a user. The second coil may have a non-planar contour.

In accordance with some aspects of the present disclosure, a method for wireless charging a wearable device is disclosed. The method may include wirelessly coupling to an externally generated magnetic field and providing power to a first electronic component in the wearable device via a plurality of coils comprising a first coil integrated with a device body of the wearable device and a second coil integrated with a portion of the wearable device that is configured to secure the wearable device to a user. The method may further include selectively connecting together the plurality of coils in different combinations including electrically connecting together the plurality of coils in a first combination comprising the plurality of coils electrically connected together to the first electronic component of the wearable device. The method may further include electrically connecting together the plurality of coils in a second combination comprising a subset of the plurality of coils electrically connected together to the first electronic component and at least one of the plurality of coils electrically connected to a second electronic component in the wearable device.

In accordance with some aspects of the present disclosure, a method of wirelessly charging a wearable device is disclosed. The method may include wirelessly coupling to an externally generated magnetic field and providing power to an electronic component in the wearable device via a plurality of coils disposed on or within different surfaces of the wearable device. At least two of the surfaces are oriented on different planes. A first mutual inductance between the plurality of coils and a transmitter coil configured to generate the externally generated magnetic field, when the wearable device is in a first orientation within the externally generated magnetic field, may be within 20% of a second mutual inductance between the plurality of coils and the transmitter coil when the wearable device is in a second orientation within the externally generated magnetic field.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings:

FIGS. 8 and 8A illustrate an example for designing coils in accordance with the present disclosure.

FIGS. 12 and 12A illustrate another example of electronic components that the coils may be configured with for wireless power transfer and wireless communication.

FIGS. 13 and 13A illustrate another configuration of coils in accordance with the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "power receiving element" to achieve power transfer.

Figure 1:
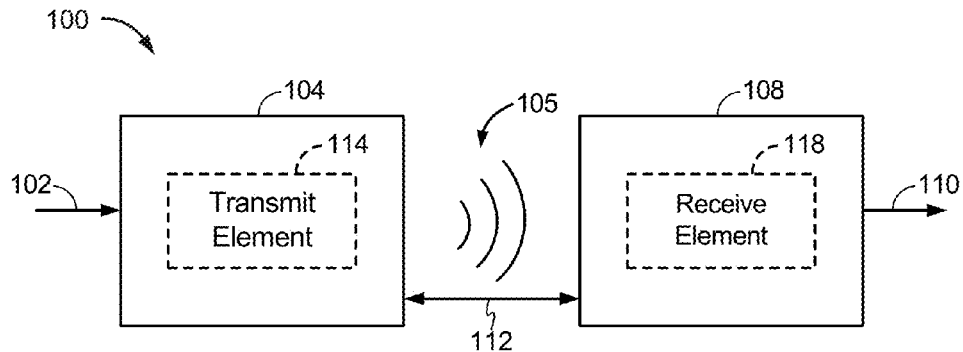
FIG. 1 is a functional block diagram of a wireless power transfer system in accordance with an illustrative embodiment.

FIG. 1 is a functional block diagram of a wireless power transfer system 100, in accordance with an illustrative embodiment. Input power 102 may be provided to a transmitter 104 from a power source (not shown in this figure) to generate a wireless field 105 (e.g., magnetic or electromagnetic) for performing energy transfer. A receiver 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element 114 for transmitting/coupling energy to the receiver 108. The receiver 108 may include a power receiving element 118 for receiving or capturing/coupling energy transmitted from the transmitter 104.

In one illustrative embodiment, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain embodiments, the wireless field 105 may correspond to the "near field" of the transmitter 104 as will be further described below. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114.

In certain embodiments, efficient energy transfer may occur by coupling a large portion of the energy in the wireless field 105 to the power receiving element 118 rather than propagating most of the energy in an electromagnetic wave to the far field.

In certain implementations, the transmitter 104 may output a time varying magnetic (or electromagnetic) field with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be more efficiently transferred. An alternating current (AC) signal induced in the power receiving element 118 may be rectified to produce a direct current (DC) signal that may be provided to charge or to power a load.

Figure 2:
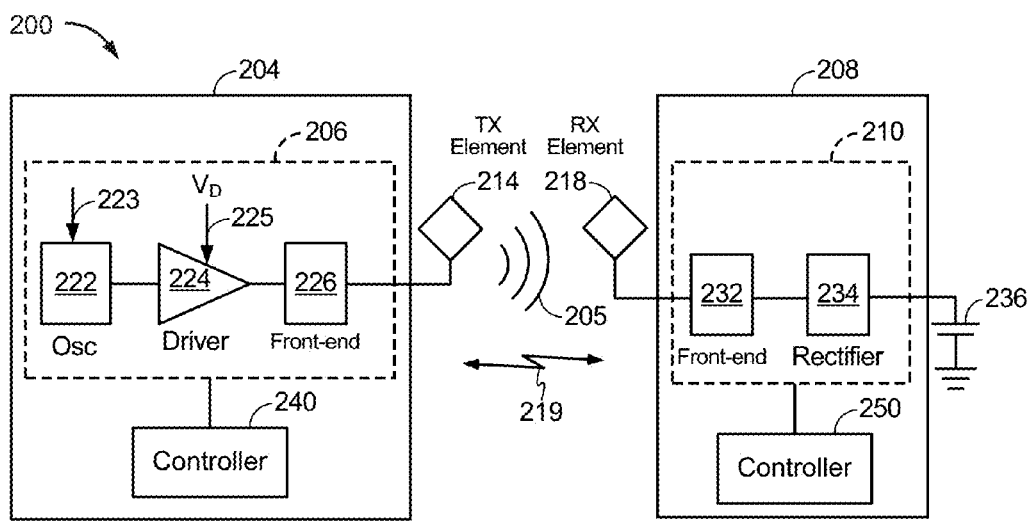
FIG. 2 is a functional block diagram of a wireless power transfer system in accordance with an illustrative embodiment.

FIG. 2 is a functional block diagram of a wireless power transfer system 200, in accordance with another illustrative embodiment. The system 200 may include a transmitter 204 and a receiver 208. The transmitter 204 (also referred to herein as power transfer unit, PTU) may include transmit circuitry 206 that may include an oscillator 222, a driver circuit 224, and a front-end circuit 226. The oscillator 222 may be configured to generate a signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output a sine wave.

The front-end circuit 226 may include a filter circuit configured to filter out harmonics or other unwanted frequencies. The front-end circuit 226 may include a matching circuit configured to match the impedance of the transmitter 204 to the power transmitting element 214. As will explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load.

The transmitter 204 may further include a controller 240 operably coupled to the transmit circuitry 206 configured to control one or aspects of the transmit circuitry 206 or accomplish other operations relevant to managing the transfer of power. The controller 240 may be a micro-controller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer.

The receiver 208 (also referred to herein as power receiving unit, PRU) may include receive circuitry 210 that may include a front-end circuit 232 and a rectifier circuit 234. The front-end circuit 232 may include matching circuitry configured to match the impedance of the receive circuitry 210 to the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. In certain embodiments, the transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

The receiver 208 may further include a controller 250 configured similarly to the transmit controller 240 as described above for managing one or more aspects of the wireless power receiver 208. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter 204 and the receiver 208.

Figure 3:
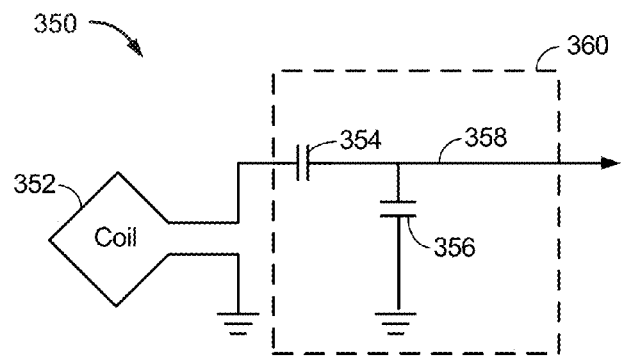
FIG. 3 is a schematic diagram of a portion of transmit circuitry or receive circuitry of FIG. 2 including a power transmitting or receiving element in accordance with an illustrative embodiment.

FIG. 3 is a schematic diagram of a portion of the transmit circuitry 206 or the receive circuitry 210 of FIG. 2, in accordance with illustrative embodiments. As illustrated in FIG. 3, transmit or receive circuitry 350 may include a power transmitting or receiving element 352 and a tuning circuit 360. The power transmitting or receiving element 352 may also be referred to or be configured as an antenna or a "loop" antenna. The term "antenna" generally refers to a component that may wirelessly output or receive energy for coupling to another "antenna." The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil or other inductor forming the power transmitting or receiving element 352. Capacitance (e.g., a capacitor) may be provided by the tuning circuit 360 to create a resonant structure at a desired resonant frequency. As a non limiting example, the tuning circuit 360 may comprise a capacitor 354 and a capacitor 356 may be added to the transmit and/or receive circuitry 350 to create a resonant circuit. In some embodiments, the tuning circuit 360 may comprise fixed capacitors selected to achieve resonance at an operational frequency of the system. In other embodiments, the tuning circuit 360 may comprise a variable capacitor or a bank of switchable capacitors that may be controlled dynamically during operation (e.g., to compensate for various detuning effects) to achieve resonance at an operational frequency of the system.

The tuning circuit 360 may include other components to form a resonant circuit with the power transmitting or receiving element 352. As another non limiting example, the tuning circuit 360 may include a capacitor (not shown) placed in parallel between the two terminals of the circuitry 350. Still other designs are possible. In some embodiments, the tuning circuit in the front-end circuit 226 may have the same design (e.g., 360) as the tuning circuit in front-end circuit 232. In other embodiments, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Reference to "coil" may be used herein to refer either to a power transmitting element (e.g., 114) or a power receiving element (e.g., 118), depending on the context in which "coil" is used.

As described above, when integrating power receiving elements into wearable devices, due to geometric irregularities, it is beneficial to the design of power receiving elements for such devices configured for wirelessly receiving power to improve or maintain sufficient mutual inductance (M) while accommodating appropriate M variation. For example, for convenience, it may be beneficial to allow a user to place a wearables device in a variety of different placement orientations without impacting the charging experience. If the mutual inductance for a particular placement orientation is different or less than the mutual inductance in other placement orientations the amount of voltage induced for that particular orientation may either be insufficient or be in a different range as compared to the other placement orientations. This can result in differing charge times for different orientations. In addition, handling variations in M due to different orientations may increase complexity and/or cost of systems that may try to accommodate the variations in M. It may be beneficial, therefore, to improve or maintain sufficient and/or substantially uniform mutual inductance for a plurality of placement orientations in order to improve charging experience, increase overall efficiency, and/or reduce complexity of a wireless charging system.

Figure 4C:
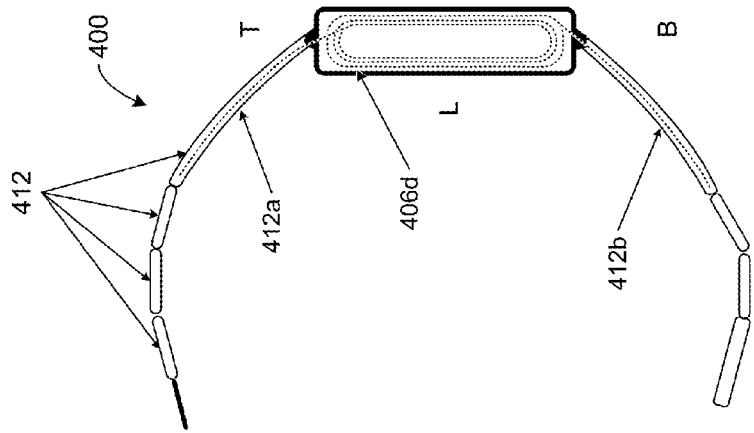
FIGS. 4A, 4B, and 4C depict an illustrative embodiment of a wearable device in accordance with the present disclosure.
Figure 4A:
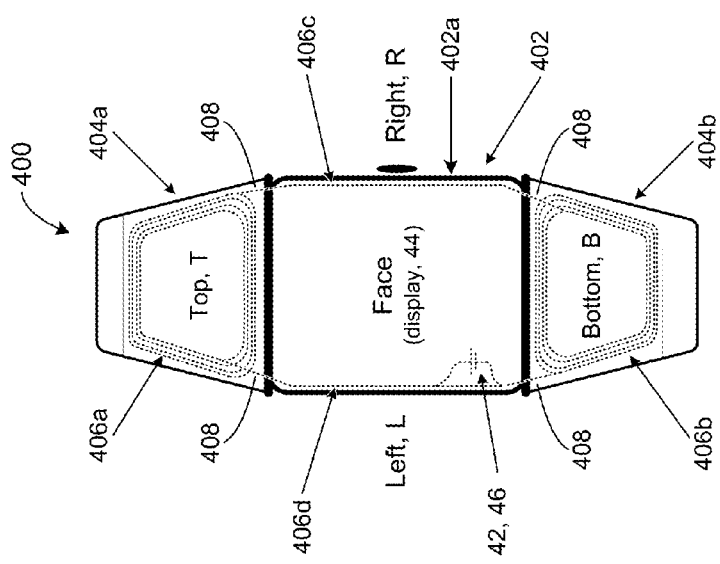

Referring to FIG. 4A, the figure represents an illustrative embodiment of a wearable device 400 that may incorporate a power receiving unit (e.g., receiver 208 of FIG. 2) in accordance with the present disclosure. The wearable device 400 may be a watch, an electronic fitness monitoring device (e.g., fitness tracker, body sensor, etc.) that can be worn, an electronic bracelet, an electronic badge, and so on. The wearable device 400 may include a device body 402, to house components of the wearable device 400, including for example, device electronics 42 (e.g., processor, controllers, communications, etc.), a display 44, power electronics 46 (e.g., battery charger, power management unit, etc.), and so on. Portions of the wearable device 400 may be configured to secure the wearable device 400 the user. In some embodiments, for example, fasteners 404a, 404b may be provided to allow the user to fasten the wearable device 400 to themselves. A watch, for example, may include straps that allow the user to fasten the watch to their wrist. A wearable electronic badge may include a clip of other suitable mechanism that allows the user to fasten the badge to their clothing.

FIG. 4A establishes some points of reference used in the present disclosure. Facing the device body 402, there is a right side R of the wearable device 400 and a left side L of the wearable device 400. A top side T of the wearable device 400 refers to a portion of top fastener 404a (e.g., strap) that is attached at the top of the device body 402. A bottom side B of the wearable device 400 refers to a portion of bottom fastener 404b that is attached at the bottom of the device body 402.

In accordance with some embodiments of the present disclosure, a power receiving unit (e.g., receiver 208 of FIG. 2) in the wearable device 400 may comprise several coils 406a, 406b, 406c, and 406d affixed to the wearable device 400. The coils 406a-406d may be of any suitable electrically conductive material such as, but not limited to, copper wire, traces patterned on flexible substrates, combinations thereof, and so on. Each coil 406a-406d may be formed by making one or more windings of the electrically conductive material, and hence may be referred to as a winding or windings.

In some embodiments, the coils 406a-406d may be disposed in, incorporated in, or otherwise integrated with the components of the wearable device 400. For example, FIG. 4A shows that a top-side coil 406a may be integrated with a portion of the top fastener 404a. The top-side coil 406a is represented in FIG. 4A by dotted lines to indicate that the coil may be embedded within the material of the top fastener 404a. The right-side view of FIG. 4B indicates this more clearly. Similarly, a bottom-side coil 406b may be integrated with a portion of the bottom fastener 404b. In other embodiments, the top-side coil 406a and bottom-side coil 406b may be affixed on a surface of respective top fastener 404a and bottom fastener 404b, for example, using a suitable adhesive. In other embodiments, the top-side coil 406a and bottom-side coil 406b may be affixed within the material of top fastener 404a and bottom fastener 404b.

Figure 4B:
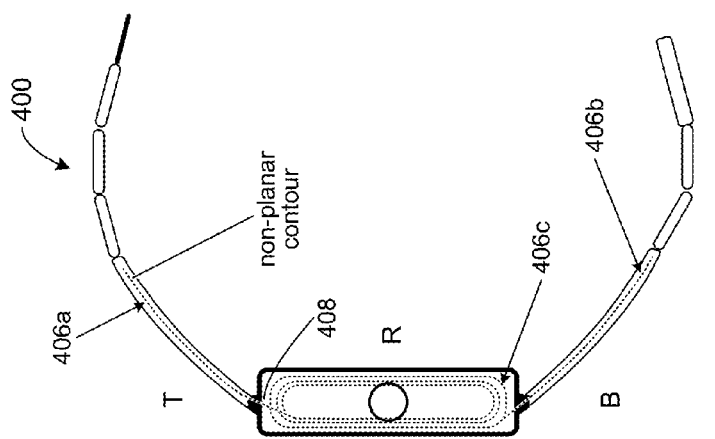

In accordance with some embodiments of the present disclosure, one or more coils 406c, 406d may be affixed to or otherwise integrated with the device body 402 of the wearable device 400. For example, the device body 402 may contain a right-side coil 406c and a left-side coil 406d. In some embodiments, the right-side coil 406c and left-side coil 406d may be affixed to respective inside surfaces of housing 402a of the device body 402. FIG. 4B illustrates more clearly the right-side coil 406c disposed within the device body 402. The left-side view of FIG. 4C, likewise, illustrates the left-side coil 406d disposed within the device body 402.

In accordance with the present disclosure, the coils 406a-406d of the wearable device 400 may comprise multiple coils that are arranged (e.g., at different angles relative to each other in three dimensions) such that they minimize mutual coupling between the coils 406a-406d. In some embodiments, for example, each coil 406a, 406b may be wound about a plane (not shown) that is orthogonal (or perpendicular) to a plane (not shown) on which coil 406c is wound and/or about a plane (not shown) on which coil 406d is wound.

In some embodiments, the coils 406a-406d may be connected together in series via suitable connections 408. Referring to FIGS. 4A and 4C, for example, one end of the winding comprising the top-side coil 406a may connect to one end of the winding comprising the left-side coil 406d. The other end of the left-side coil 406d may connect to the bottom-side coil 406b, as can be seen FIGS. 4C and 4A. The series connection may continue with the bottom-side coil 406b connected to the right side coil 406c, as shown in FIGS. 4A and 4B, and the right-side coil 406c may connect to the other end of the top-side coil 406a as shown in FIGS. 4B and 4A.

Figure 5A:
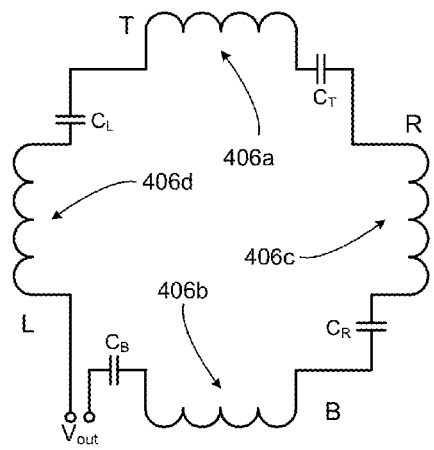
FIGS. 5A and 5B are schematic representations the coils shown in FIGS. 4A-4C.
Figure 5B:
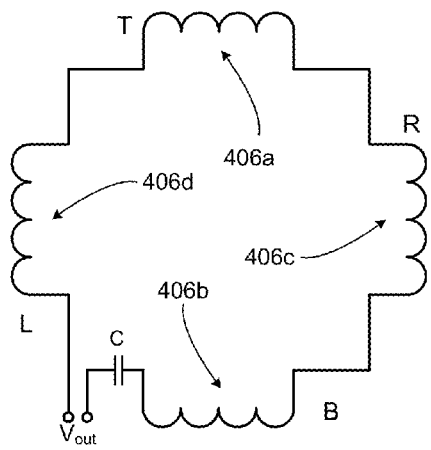

Referring for a moment to FIG. 5A, the figure shows a schematic representation of the coils 406a-406d connected in series, in accordance with some embodiments. The schematic includes capacitors CT, CB, CR, and CL associated respectively with top-side coil 406a, bottom-side coil 406b, right-side coil 406c, and left-side coil 406d. Each coil/capacitor pair (e.g., 406a and capacitor CT) may define a resonant circuit, and can be tuned (e.g., by selecting a suitable value for the capacitor) to resonate at a frequency of an externally generated magnetic field 74. In other embodiments, a single capacitor C may be connected to the end of the series-connected coils 406a-406d, as illustrated, for example, in FIG. 5B. In other embodiments (not shown), a plurality of capacitors of different capacitance values may be provided with switching circuitry to selectively switch in different capacitors to define resonant circuits having different resonant frequencies. In still other embodiments (not shown), variable capacitors and/or variable inductors may be provided and adjusted to maintain resonance at a particular frequency.

Figure 6A:
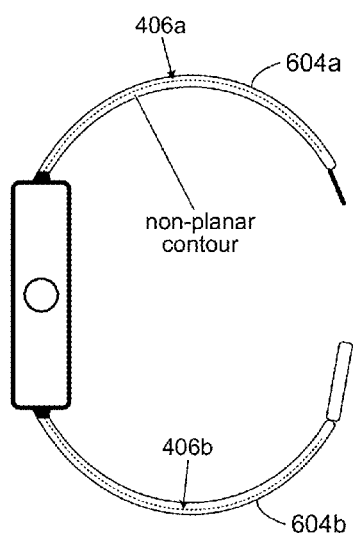
FIGS. 6A and 6B illustrate examples of alternative fastener configurations of a wearable device.

Returning to FIGS. 4A-4C, in some embodiments, the top-side coil 406a and bottom-side coil 406b may have a non-planar contour, for example, to allow for the curvature in a watch straps. The illustrative example depicted in FIGS. 4A-4C shows that the strap (e.g., top and bottom fasteners 404a, 404b) has a slight curvature. FIG. 6A, for example, illustrates an example of flexible strap 604a, 604b (e.g., neoprene material) that can impose a more dramatic non-planar contour on the coils 406a, 406b. As the figure illustrates, the coil may extend much of the length of the flexible strap 604a, 604b.

Figure 6B:
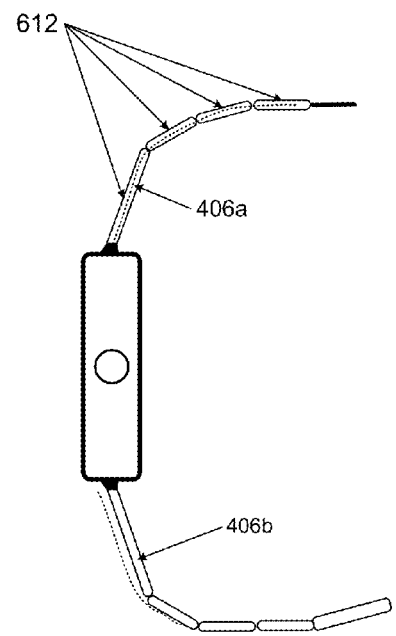

Returning to FIGS. 4A-4C, in some embodiments, the fastener may comprise several connected link segments 412. In some embodiments, the coils 406a, 406b may be disposed in link segments 412a, 412b nearest the device body. FIGS. 4A-4C, for example, show that the top-side coil 406a and bottom-side coil 406b are disposed in respective first and second link segments 412a, 412b. In other embodiments, such as illustrated in FIG. 6B for example, the coils 406a, 406b may span several link segments 612.

Figure 7A:
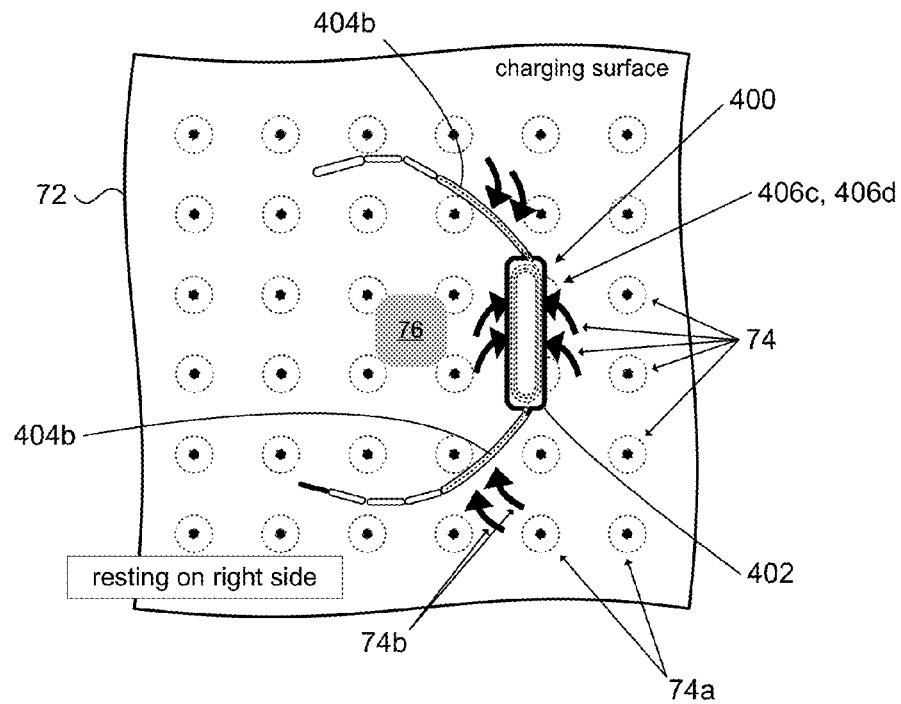
FIGS. 7A, 7B, 7C, 7D, and 7E show illustrative examples of placement orientations of a wearable device.
Figure 7B:
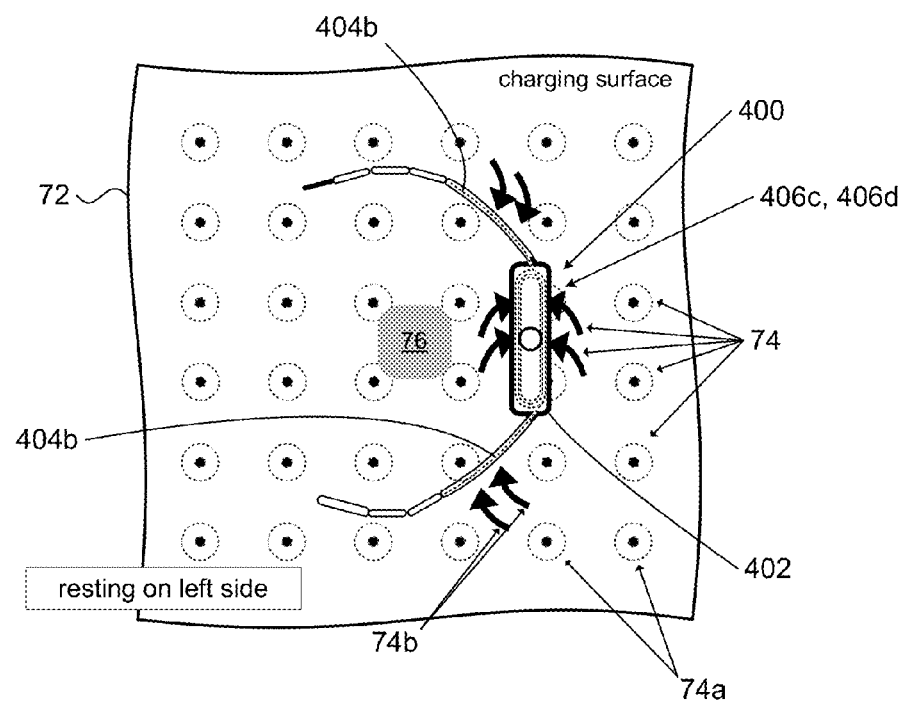
Figure 7C:
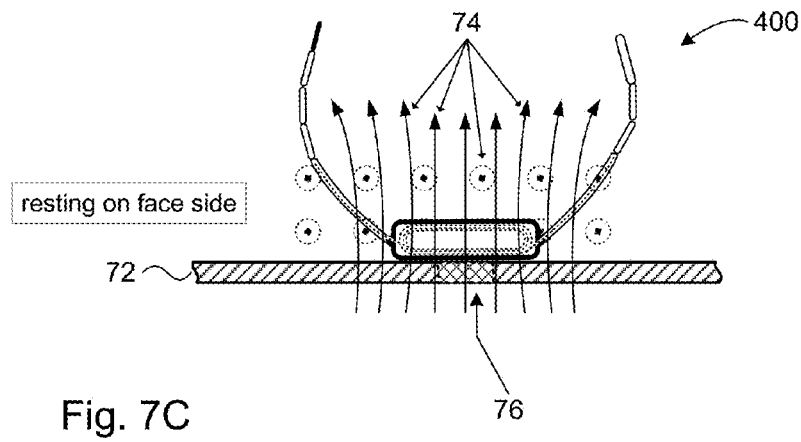
Figure 7D:
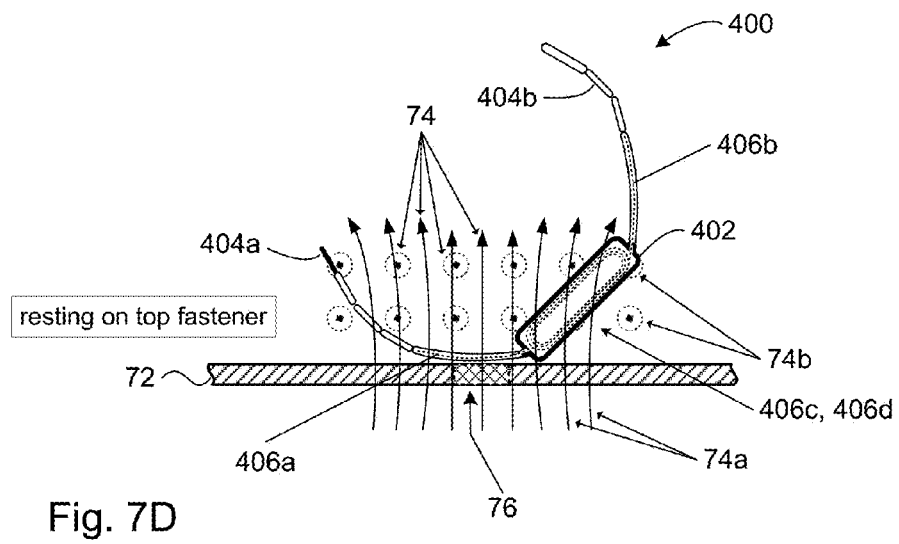
Figure 7E:
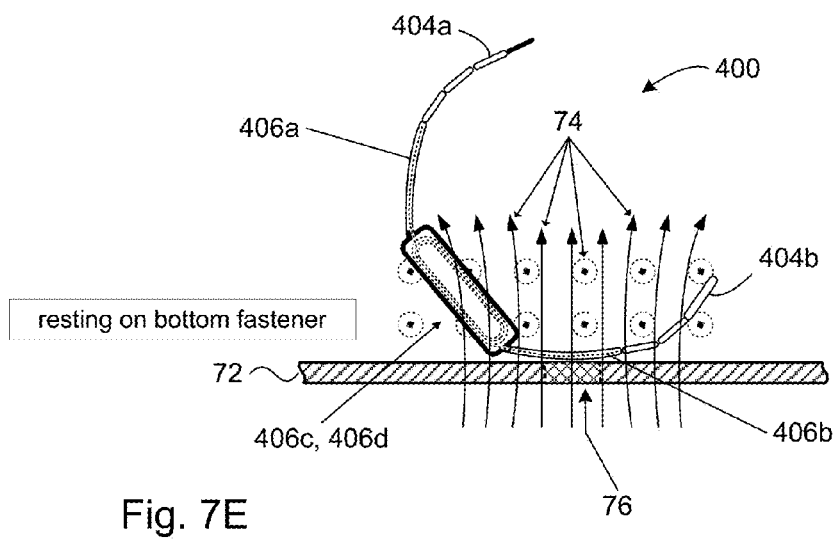

Referring to FIGS. 4A-4C and FIGS. 7A-7E, wearable device 400 in accordance with the present disclosure may be placed on a charging surface 72 (e.g., charging surface of a power transmitting unit such as transmitter 204 shown in FIG. 2) in different orientations. The wearable device 400, for example, may be placed in an orientation where the wearable device 400 rests on the right side or left side of the device body 402, such as illustrated in FIGS. 7A and 7B respectively. The wearable device 400 may be placed face down on the charging surface 72, such as illustrated in FIG. 7C for example. The wearable device 400 may be placed on the charging surface 72 on its fastener. FIG. 7D, for example, shows the wearable device 400 resting on a top fastener 404a, and FIG. 7E shows an example of the wearable device 400 resting on a bottom fastener 404b. These placement orientations illustrate different orientations the user can place their wearable device on the charging surface.

FIGS. 7A-7E illustrate representations of an external magnetic field 74 (e.g., an alternating or time-varying magnetic field such as an AC magnetic field) generated at the charging surface 72; e.g., by a coil (not shown) beneath the charging surface 72. Coils 406a-406d (collectively, coils 406) in the wearable device 400 can couple to the externally generated magnetic field 74. The degree of coupling may be expressed as the mutual inductance (M) between the coils 406 in the wearable device and the coil (not shown) of the charging surface 72, which may be referred to as "the mutual inductance;" e.g., the mutual inductance of the wearable device or coil, the coil's mutual inductance, and so on.

Some coils 406 comprising the PRU in the wearable device 400 may have more coupling with the external magnetic field 74 than other coils 406 in the wearable device 400, depending on the orientation of the coils 406 with respect to the magnetic field lines of the external magnetic field 74. Referring to FIG. 7A, for example, when the wearable device 400 is resting on its right side, the coils 406c, 406d in the device body 402 lie perpendicular to the stronger vertical field component 74a of the magnetic field 74, so those coils 406c, 406d can have maximum coupling with the magnetic field 74. In some embodiments, depending on actual placement, the coils 406c, 406d in the device body 402 may be at an angle other than 90°. The coils 406a, 406b respectively in the top and bottom fasteners 404a, 404b, on the other hand, lie edge-on with respect to the vertical field component 74a of the magnetic field 74 and so those coils 406a, 406b may couple predominantly to the weaker horizontal field component 74b of the magnetic field 74. The coils 406a, 406b in the top and bottom fasteners 404a, 404b may therefore exhibit less coupling to the magnetic field. The total coupling of the coils 406 for the placement of the wearable device 400 shown in FIG. 7A may be expressed as total mutual inductance $M_1$.

As another example, consider FIG. 7D where the wearable device 400 is shown resting on the top fastener 404a. The coil 406a in the top fastener 404a lies perpendicularly to the vertical field component 74a of the magnetic field 74 and so can have maximum coupling with the magnetic field 74 as compared to the other coils in different orientations relative to the magnetic field 74. The coils 406c, 406d in the device body 402 may be more weakly coupled to the vertical field component 74a of the magnetic field 74 because they lie edge-on in relation to the vertical field component 74a of the magnetic field 74. The coils 406c, 406d in the device body 402 can, however, couple to the weaker horizontal field component 74b of the magnetic field 74. The coil 406b in the bottom fastener 404b may experience some degree of coupling with the vertical field component 74a of the external magnetic field 74; more than the coils 406c, 406d in the device body 402, but less that than the coil 406a in the top fastener 404a. The total coupling of the coils 406 for the placement of the wearable device 400 on the charging surface 72 shown in FIG. 7D may be expressed as total mutual inductance $M_2$. Different values of total mutual inductance can be obtained for different placement orientations of the wearable device 400 on charging surface 72.

In accordance with the present disclosure, the coils 406 comprising the power receiving unit (e.g., receiver 208 of FIG. 2) in the wearable device 400 may be designed and/or arranged (e.g., number of turns/windings selected in a particular area, shape of windings, and so on) so that the total mutual inductance M is substantially the same (e.g., within some tolerance threshold) for at least two or all different placement orientations of the wearable device 400 on the charging surface 72. For example, suppose the total mutual inductance of the wearable device 400 is $M_1$ when it is placed on the charging surface 72 in a first orientation (e.g., on right side as shown in FIG. 7A). In accordance with the present disclosure, the coils 406 may be configured such that $M_1$ is approximately the same as the total mutual inductance $M_2$ of the wearable device 400 when it is placed on the charging surface 72 in a second orientation (e.g., on top side as shown in FIG. 7D). In some embodiments, the placement orientation may be referenced to a reference location on the charging surface 72 for the purposes of comparing mutual inductance. In some embodiments, for example, the reference location may be the center of the charging surface (e.g., 76, FIG. 7A).

In some embodiments, $M_1$ may be the largest value of mutual inductance measured for a given set of placement orientations on the charging surface, and $M_2$ may be the smallest value of mutual inductance measured from that set of placement orientations. The variation between $M_1$ and $M_2$ may be expressed as a percentage. In some embodiments, for example, $M_1$ may be 20% higher than $M_2$. For example, the maximum value of mutual inductance may be 20% higher than the minimum value of mutual inductance, for a given set of placement orientations. In other embodiments, the variation between $M_1$ and $M_2$ may be expressed as a ratio between the two values. In some embodiments, the ratio between $M_1$ and $M_2$ may be about 1.2. For example, the ratio between a maximum value of mutual inductance and a minimum value of mutual inductance for a given set of placement orientations may be about 1.2. This aspect of the present disclosure will be discussed below.

Referring to FIG. 7A, some considerations for the geometry of the coils 406 comprising the PRU in a wearable device 400 in accordance with the present disclosure include:

The external magnetic field 74 generated at the charging surface 72 has a horizontal field component 74b as well as a vertical field component 74a. When designing the coils 406, coupling to the horizontal field and the vertical field should be taken into consideration.

Design parameters such as the number of turns (N) in a given coil 406a, 406b, 406c, 406d and the area (A) of the given coil may be initially selected as a first-order approximation. The initial values for N and A may not achieve uniform set of mutual inductance values M for a given set of placement orientations. However, systematically adjusting N and A over several iterations can result in a suitable uniform set of M.

FIG. 8 illustrates a process for designing coils comprising a power receiving unit (e.g., receiver 208 of FIG. 2) in a wearable device in accordance with some embodiments of the present disclosure. The coils 406a-406d for the wearable device 400 shown in FIGS. 4A-4C will serve as an example in order to explain the process; although, it will be appreciated that different wearable devices will have different numbers of coils, different numbers of turns in each coil, different coil geometries, different placement locations, and so on.

At block 802, a target mutual inductance $M_{target}$ may be selected. The process can be an iterative process, and as will become clear, $M_{target}$ may serve as a termination criterion for the iterative process.

At block 804, several areas on the wearable device 400 may be identified. These areas may serve as placement locations on the wearable device 400 for placement of a coil (e.g., 406a). In the model shown in FIGS. 4A-4C, for example, areas may include various sides of the device body 402 such as the right side R, the left side L, the face side, and the bottom side B. Areas may include areas on a fastener 404a, 404b of the wearable device 400. In the model shown in FIGS. 4A-4C, for example, such areas may include a portion of the top fastener 404a and a portion of the bottom fastener 404b, and so on.

At block 806, initial coil parameters may be used to design coils for each identified area. In some embodiments, for example, coil parameters may include the number of turns (N) in the coil, spacing (S) between each turn in the coil, and coil area (A). In other embodiments, additional parameters may be used, such as coil geometry, etc.

Since the design may be an iterative process, any suitable set of initial coil parameters may be used to design the coils. In some embodiments, for example, each coil 406a-406d may have the same initial N and S parameters. Initially, the A parameter may be the same for each coil 406a-406d, or may be determined depending on the location of the coil 406a-406d on the wearable device 400. In other embodiments, the initial N, S, and A parameters may be different for some coils and the same for other coils. In still other embodiments, the initial N, S, and A parameters may be chosen randomly.

Referring for a moment to FIG. 8A, the figure shows a matrix for mutual inductance values in accordance with some embodiments of the present disclosure. Each row (i) in the matrix may represent a coil (e.g., 406a-406d) placed at a particular location on a wearable device (e.g., 400); for example, right side of device body, top side of strap, etc. There may n such locations. Each column (j) in the matrix may represent a placement orientation of the wearable device on a charging surface. FIGS. 7A-7E, for example, show various placement orientations, such as placing the wearable device 400 face down on the charging surface 72, on its left side, and so on. There may be m such device orientations. In some embodiments, the power transmitting unit (e.g., transmitter 204 of FIG. 2) may be a 3-dimensional charger comprising two more non-coplanar charging surfaces. Each device orientation may therefore represent an orientation within the volume space defined by the charging surfaces.

Returning to FIG. 8, at block 808, the matrix shown in FIG. 8A may be completed in the following manner. For each coil location (i) on the wearable device 400, attach a coil 406a-406d at that location on the wearable device 400 without connecting together the coils. Position the wearable device 400 on an active charging surface in each of the m device orientations. For each device orientation (j), measure the mutual inductance $M_{ij}$ of that coil to the charging surface. This may be repeated for each of the n locations and each device orientation until the matrix is completed. Thus, for example, mutual inductance $M_{xy}$ represents the mutual inductance of a coil 406a-406d at coil location x on the wearable device 400 when the wearable device 400 is placed on the charging surface at device orientation y.

In some embodiments, the foregoing data may be collected from simulations. For example, the wearable device 400 and a charging surface may be modeled using tools for modeling or simulating electromagnetic environments. In other embodiments, it may be more practical to build a physical mock up of the wearable device 400 with a coil 406a-406d at a given location on the wearable device 400 and place the wearable device 400 on a physical charging surface to make actual measurements for the different device orientations.

At block 810, the completed matrix may be used to determine if a uniform M has been achieved. Each column (j) in the matrix may be summed to compute a total mutual inductance metric $$\left(M_j = \sum_{i=1}^{n} M_{ij}\right)$$

for the wearable device 400 for a given device orientation (j) on the charging surface. The total mutual inductance ($M_j$) represents the combined contribution of the mutual inductances of the individual coils on the wearable device 400 at the given device orientation (j).

In some embodiments, $M_{target}$ may serve as a criterion for assessing uniform M. However, it will be appreciated that any suitable criterion may be used. A non-exhaustive list includes, for example:

the average of the total mutual inductance for each device orientation $$\left(\sum_{j=1}^{m} M_j\right)$$

is greater than or equal to $M_{target}$ each value of $M_j$ is within a percentage (e.g., 5%, 10%, 15%, 20%) of $M_{target}$ each value of $M_j$ is within a percentage (e.g., 5%, 10%, 15%, 20%) of each other the maximum $M_j$ and the minimum $M_j$ are within some percentage (e.g., 5%, 10%, 15%, 20%) of each other, and the minimum $M_j$ is within some percentage of $M_{target}$ the ratio of the maximum $M_j$ to the minimum $M_j$ is within some value (e.g., about 1.2), and the minimum $M_j$ is within some percentage of $M_{target}$ and so on.

If a uniform M is not achieved, then at block 812 one or more coils 406a-406d may be re-designed by adjusting one or more of their parameters. The process may repeat from 808. The coils 406a-406d may be re-designed in any of a number of ways, with each iteration. In some embodiments, for example, the N of each coil 406a-406d may be adjusted and the process repeated. Both the N and S of each coil 406a-406d may be adjusted and the process repeated. One or more parameters of only some of the coils 406a-406d may be adjusted and the process repeated, and so on. With each iteration, the coil designs may converge such that the total mutual inductances ($M_j$) for all device orientations (j) also converge to a solution.

In some embodiments according to the present disclosure, coils in a wearable device (e.g., 400, FIGS. 4A-4C) may be connected together in various selectable configurations. Referring to FIG. 9, for example, in some embodiments switching circuitry such as switches 902 may be connected between a top-side (T) coil, right-side (R) coil, bottom-side (B) coil, and left-side (L) coil. Each switch 902 may be connected to a pair of coils. A set of bypass lines 904 may be connected between the switches 902, each switch 902 being connected to a pair of bypass lines 904. Each switch 902 may be configured to selectively connect together its associated pair of coils, its associated pair of bypass lines 904, or a coil to a bypass line 904.

A tunable capacitor 910 may be provided at an output $V_{out}$ to tune a particular configuration of coils to a frequency of an externally generated magnetic field, thus defining a resonant circuit with the coils. In other embodiments, capacitor 910 may comprise one or more capacitors selectively electrically connected together to adjust the total reactance. The output $V_{out}$ may be connected to an electronic component in the wearable device.

A controller 906 may operate the switches 902 to selectively connect together different combinations of coils T, R, B, L and bypass lines 904, and tune the capacitor 910 accordingly to define one or more resonators. In some embodiments, for example, the controller 906 may operate switches 902 in accordance with information produced by one or more sensors 908. The sensor 908 may be any suitable kind. In some embodiments, for example, sensors 908 may include accelerometers, geomagnetic sensors, gyroscopic sensors, and other spatial orientation sensors. To provide information relating to orientation of the wearable device (e.g., 400, FIGS. 4A-4C) and hence the coils T, R, B, L. In some embodiments, the controller 906 may be used to compute an orientation of the wearable device from sensor information collected from the sensors 908. The controller 906 may use the orientation information to connect the coils T, R, B, L in a suitable combination, for example, to maximize mutual inductance value or to achieve a specific mutual inductance, etc. For example, the controller 906 may detect a first orientation of the wearable device 400 and use the orientation information to connect the coils T, R, B, L in a first combination where a first mutual inductance between the coils and a power transmitting element (e.g., power transmitting element 214 of FIG. 2) has a first value. The controller 906 may then detect a second orientation of the wearable device 400 after it has been re-positioned and connect the coils T, R, B, L in a second combination where a second mutual inductance between the coils and a power transmitting element (e.g., power transmitting element 214 of FIG. 2) has a second value that is substantially the same as the first value or within some tolerance (e.g., within 20% or less). In this way the controller 906 may dynamically adjust the mutual inductance based on a detected orientation. The ability to selectively adjust connections between the coils T, R, B, L may be one parameter may be used in the process of FIG. 8 to determine the coil arrangement desired.

In some embodiments, sensors 908 may include a radio frequency identification device (RFID). For example, a charging surface (e.g., 72, FIG. 7A) may be equipped with an RFID transmitter. When the wearable device comes in proximity to the RFID transmitter of the charging surface, an RFID sensor may generate a signal to "wake up" the controller 906. The controller 906 may then connect the coils T, R, B, L in a suitable configuration for wireless power transfer, for example, based on orientation information obtained from the sensors 908.

In some embodiments, sensors 908 may include a near-field communication (NFC) device. For example, a charging surface (e.g., 72, FIG. 7A) may be equipped with an NFC transmitter. The charging surface may communicate information to an NFC sensor regarding capabilities of the charging surface; for example, the amount of power that the charging surface can transmit. The NFC sensor may communicate such information to the controller 906. In turn, the controller 906 can connect coils T, R, B, L in a suitable configuration.

Figure 9A:
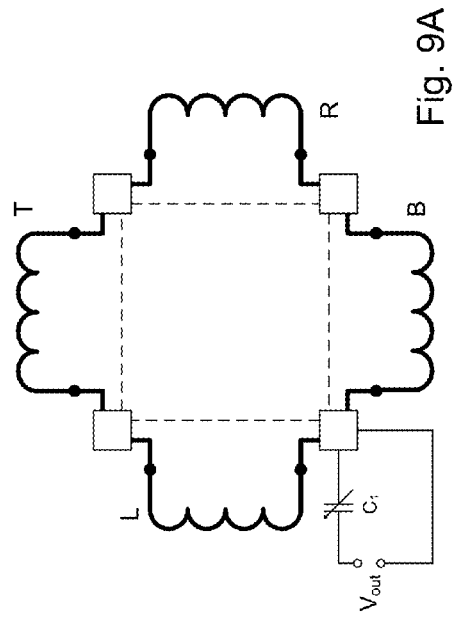
FIGS. 9 and 9A, 9B, and 9C illustrate an example of a configurable arrangement of coils in accordance with the present disclosure.
Figure 9C:
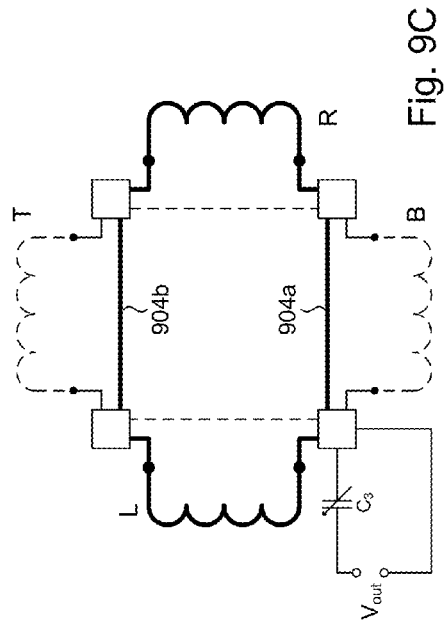
Figure 9:
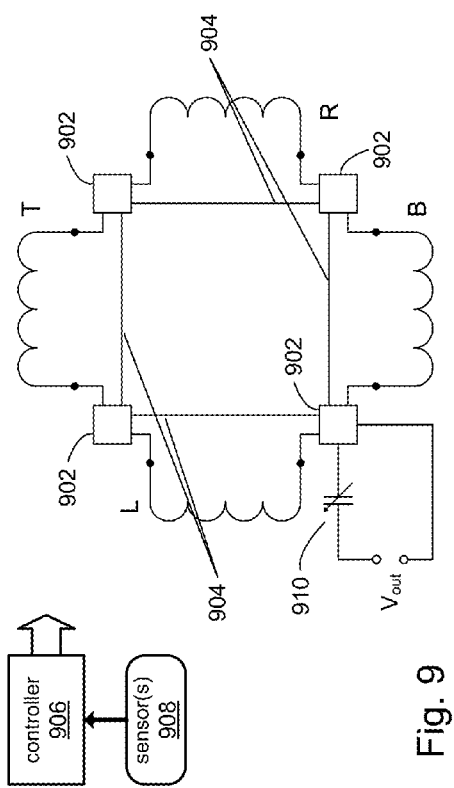
Figure 9B:
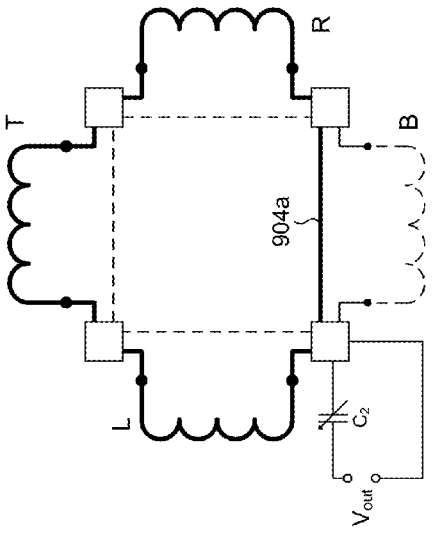

FIGS. 9A-9C show some illustrative coil configurations that can be selected by the switches 902. FIG. 9A, for example, shows all four coils in a series-connected configuration. Thus, the switches 902 connect together the L- and T-coils, the T- and R-coils, and the R- and B-coils. In this configuration, the bypass lines 904 are not used. The output $V_{out}$ may be connected across the B- and L-coils. The tunable capacitor 910 may be set to a suitable capacitance $C_1$ to define a resonant circuit with the four coils.

FIG. 9B illustrates a series-connected configuration comprising only the L-, T-, and R-coils. The output $V_{out}$ is connected to one end of the L-coil and one end of the R-coil via bypass line 904a. The tunable capacitor 910 may be set to a suitable capacitance $C_2$ to define a resonant circuit with the three series-connected coils.

FIG. 9C illustrates a parallel-connected configuration comprising the L-coil in parallel with the R-coil via bypass lines 904a, 904b. The tunable capacitor 910 may be set to a suitable capacitance $C_3$ to define a resonant circuit with the L- and R-coils. It will be understood that still other coil configurations are possible. In other embodiments, additional bypass lines 904 may be provided among the switches 902 to allow for additional coil configurations.

Figure 10:
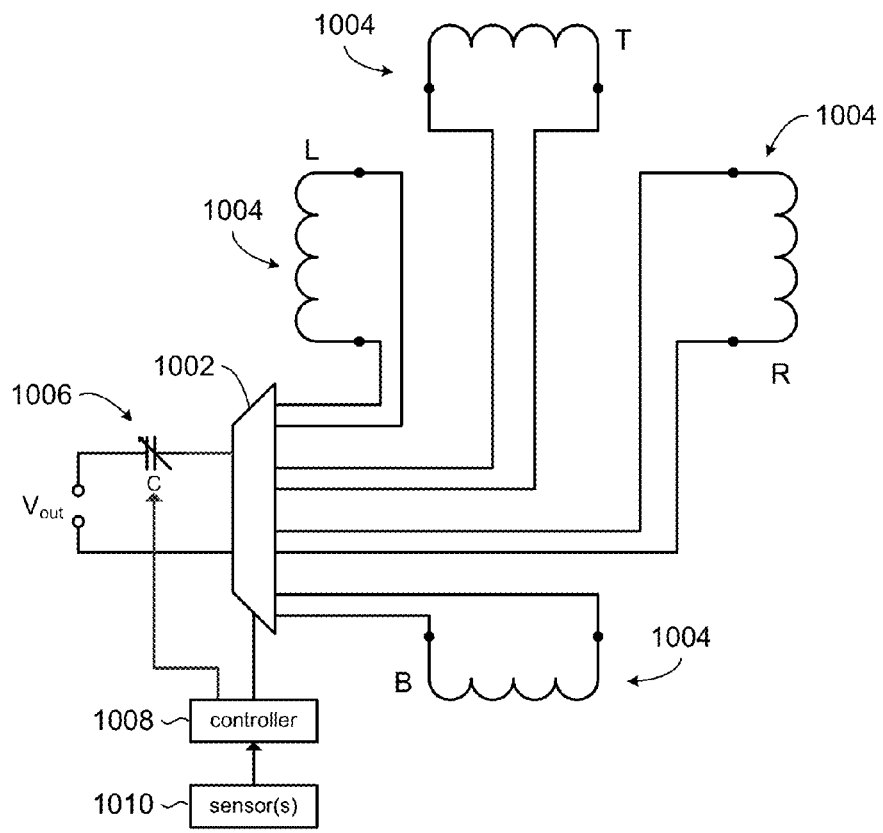
FIG. 10 illustrates another example of a configurable arrangement of coils in accordance with the present disclosure.

Referring to FIG. 10, in accordance with some embodiments, the switching circuitry to selectively connect together coils 1004 in different combinations may be a switch matrix 1002 as an alternative to the individual switches 902 shown in FIG. 9. FIG. 10, for example, illustrates a switch matrix 1002 having inputs connected to the coils 1004. The switch matrix 1002 may be configured to connect the coils 1004 together in various combinations (e.g., as shown in FIGS. 9A-9C). The switch matrix 1002 may connect the configuration of coils 1004 to an output $V_{out}$. A controller 1008 may operate the switch matrix 1002, and a tunable capacitor 1006 may be included to provide for a resonant circuit. The controller 1008 may operate in response to sensor information provided by sensor 1010, for example, such as describe above.

Figure 11:
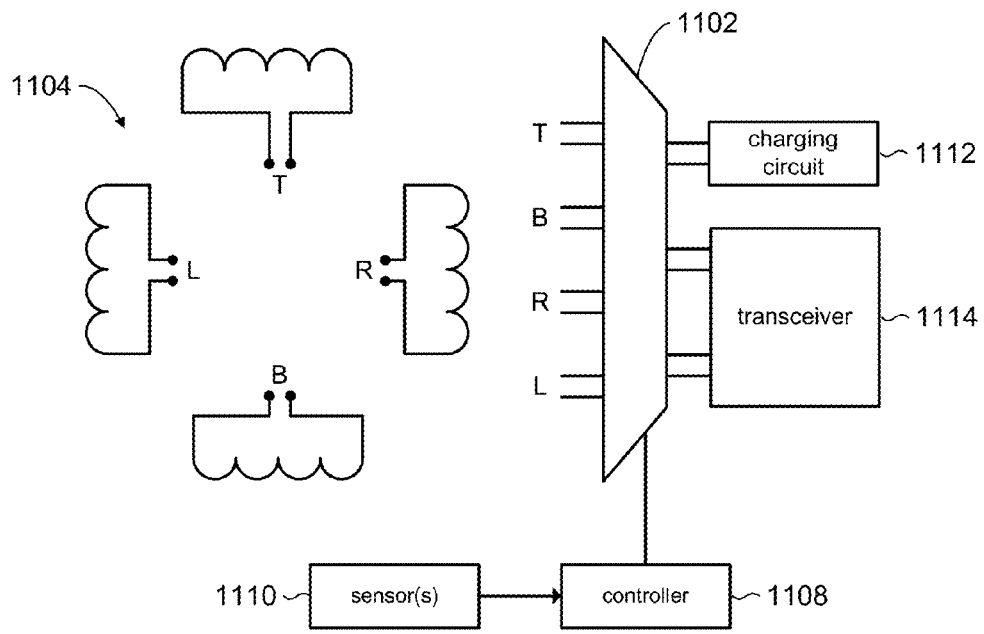
FIG. 11 illustrates an example of electronic components that the coils may be configured with for wireless power transfer and wireless communication.

Referring to FIG. 11, in accordance with the present disclosure, some of the coils in a wearable device (e.g., 400, FIG. 4A) may be configured to couple to an external magnetic field for wireless power transfer, while other coil(s) may be configured as antennas for wireless communication. In some embodiments, for example, a coil may be configured as an antenna for Long Term Evolution (LTE) communication, Universal Mobile Telecommunications System (UMTS) communication, code division multiple access (CDMA) communication, Global System for Mobile (GSM) communication, and so on. Other wireless communications may include WiFi communication, Bluetooth communication, global positioning system (GPS) communication, radio communication, and so on. FIG. 11, for example, illustrates a plurality of coils 1104 (e.g., top-side coil, right-side coil, bottom-side coil, left-side coil) that can be connected to the inputs of a switch matrix 1102. Various electronic components may be connected to the outputs of the switch matrix 1102. The electronic components, for example, may include a charging circuit 1112, a transceiver 1114, and other circuits (not shown) such as a power management circuit, a transmitter, a receiver, and so on.

A controller 1108 may operate the switch matrix 1102 to connect different combinations of the coils 1104 to different electronic components. One or more capacitors (not shown) may be provided and selectively switched by the switch matrix 1102. Some capacitors may be connected with coils to form resonators for wireless power transfer. Some capacitors may be connected with coils to form antennas for wireless communication.

In some embodiments, for example, one or more sensors 1110 may be included to produce orientation information that can be provided to the controller 1108. The controller 1108 may determine which coils 1104 to configure as communication antennas and which coils to configure for wireless power transfer in response to such orientation information. In some embodiments, sensors 1110 may sense signal strength of communication signals. The controller 1108 may reconfigure the coils 1104 to produce a different arrangement of communication antennas in response to the sensed signal strength. In some embodiments, sensors 1110 may sense power transfer levels during wireless power transfer. The controller 1108 may reconfigure the coils 1104 to produce a different arrangement of coils 1104 for wireless power transfer in response to the sensed power levels, and so on.

The use of sensors 1110 can allow for reconfiguring coils 1104 to occur without the user necessarily being aware of the reconfiguring. For example, the sensors 1110 may detect that the wearable device is on a charging surface, in which case the coils 1104 may be automatically configured as resonators for wireless power transfer. If the user picks up the wearable device, the sensors 1110 may detect this and automatically reconfigure the coils 1104 to serves as one or more antennas.

Merely as an example to illustrate a configuration, the controller 1108 may operate the switch matrix 1102 to connect together the left-side coil L and the right-side coil R to form a resonator (together with a capacitor, for example) for wireless power transfer. The controller 1108 may operate the switch matrix 1102 to connect the resonator to the charging circuit 1112. The controller 1108 may operate the switch matrix 1102 to connect the top-side coil T to the transceiver 1114 to serve as a main antenna for communication. The controller 1108 may operate the switch matrix 1102 to connect the bottom-side coil B to the transceiver 1114 to function as a diversity antenna, and so on.

Referring to FIG. 12, a wearable device 1200 in accordance with the present disclosure may include a face-side (F) coil 1202, in addition to the T-, R-, B-, and L-coils 1204.

Referring to FIG. 12A, a switch matrix 1212 may selectively connect the coils 1202, 1204 in different configurations as explained above. In some embodiments, for example, the face-side coil 1202 in one configuration may be configured as a resonator for wireless power transfer. In another configuration, the face-side coil 1202 may be configured as an antenna for GPS signals. In some configurations, a coil 1202, 1204 may be configured as an antenna for Bluetooth or WiFi communication, and so on.

Referring to FIG. 13, in some embodiments, a coil 1304 may be positioned within the perimeter of a separate larger coil 1302. FIG. 13 shows such a "nested" configuration with a first top-side (T1) coil 1302 and a second top-side (T2) coil 1304. The number of turns of the inner coil (T2) 1304 may be used to control the frequency for antenna matching purposes when the T2 coil 1304 is configured to serve as an antenna. The spacing S between the T1 coil 1302 and the T2 coil 1304, likewise, can be used to control input impedance when the T2 coil 1304 is configured to serve as an antenna. The switch matrix 1312 shown in FIG. 13A illustrates the configurability of the T1 and T2 coils 1302, 1304. In one configuration, for example, the T1 coil 1302 and the T2 coil 1304 may be connected together to form a resonator configured to couple with an external magnetic field for wireless power transfer. In another configuration, the T1 coil 1302 may be configured as a resonator, and the T2 coil 1304 may be configured as an antenna, and so in with other configurations.

The present disclosure proposes a design to provide a uniform M irrespective of the orientation of the wearable device on a charging surface. The present disclosure also shows antennas for various wireless communication applications (e.g., wireless wide area network, WWAN).

A wireless charging system in a wearable device may include several coils configured on the wearable device. Some of the coils may have a non-planar contour, for example to follow the bends in a fastener of the wearable device. The coils may be configured to couple to an external magnetic field for wireless power transfer to provide power to one or more electronic components in the wearable device. In some embodiments, the coils may have a total mutual inductance that does not vary substantially with different placement orientations of the wearable device within the magnetic field.

A method to configure a wearable device with a wireless charging system may include first determining a target mutual inductance of the wearable device. The individual mutual inductance of each coil on the wearable device may be determined for a plurality of placement orientations of the wearable device in a magnetic field. The coil designs may be iteratively modified until the total mutual inductance is substantially uniform with respect to the target mutual inductance for all placement orientations of the wearable device within the magnetic field.

A wireless charging system may include a plurality of coils and a plurality of switches to selectively configure the coils in different combinations. In some combinations, the coils may be configured for wireless power transfer. In other combinations, some of the coils may be configured for wireless power transfer and some of the coils may be configured for wireless communications.

In some embodiments, the switches may connect the coils to different electronic components of the wearable device. The electronic components may include a power management circuit, one or more wireless communication circuits, and so on.

While certain embodiments described herein have been described relative to wearable devices, it should be appreciated the principles and operation of the various embodiments described herein may be similarly applied to a variety of different devices that may wish to incorporate a power receiver unit.

The various operations of methods described above may be performed by any suitable means capable of performing the operations, such as various hardware and/or software component(s), circuits, and/or module(s). Generally, any operations illustrated in the figures may be performed by corresponding functional means capable of performing the operations.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims Based on the above disclosure and the following claims, other arrangements, embodiments, implementations and equivalents may be employed without departing from the scope of the present disclosure as defined by the claims.

What is claimed is:

1. A wireless charging system for a wearable device, the wireless charging system comprising:
   a plurality of coils configured, in the presence of an externally generated magnetic field, to wirelessly provide power to an electronic component in the wearable device, the plurality of coils comprising:
   a first coil integrated with a device body of the wearable device; and
   a second coil integrated with a portion of the wearable device that is configured to secure the wearable device to a user, the second coil having a non-planar contour,
   wherein the plurality of coils are disposed such that a respective plane of at least one coil is at least partially perpendicular to the externally generated magnetic field responsive to the wearable device being disposed in any orientation at a same location on a charging surface.

2. The system of claim 1, wherein a first mutual inductance induced between the plurality of the coils and the transmitter coil responsive to the wearable device being in a respective first orientation is within 20% of a second mutual inductance induced between the plurality of the coils and the transmitter coil responsive to the wearable device being disposed in any second orientation at the same location on the charging surface.

3. The system of claim 1, wherein the first coil is perpendicular to a first component of the externally generated magnetic field when the wearable device is in a first orientation and the second coil is perpendicular to the first component of the externally generated magnetic field when the wearable device is in a second orientation.

4. The system of claim 1, wherein the first coil is not perpendicular to a first component of the externally generated magnetic field when the wearable device is in a first orientation and the second coil is not perpendicular to the first component of the externally generated magnetic field when the wearable device is in a second orientation.

5. The system of claim 1, wherein a combined mutual inductance between the plurality of coils and a transmitter coil configured to generate the externally generated magnetic field is the same at any orientation at the same location on the charging surface of the wearable device within the externally generated magnetic field.

6. The system of claim 1, wherein a maximum ratio between a first mutual inductance induced between the plurality of the coils and the transmitter coil responsive to the wearable device being in a respective first orientation to a second mutual inductance induced between the plurality of the coils and the transmitter coil responsive to the wearable device being disposed in any second orientation at the same location on the charging surface is 1.2.

7. The system of claim 1, wherein a first plane on which the first coil is wound is orthogonal to a second plane on which the second coil is wound.

8. The system of claim 1, further comprising a plurality of capacitors, each coil of the plurality of coils electrically coupled to a respective one of the plurality of capacitors.

9. The system of claim 8, wherein each coil and the respective capacitor form a resonant circuit configured to resonate at a frequency of the externally generated magnetic field.

10. The system of claim 1, wherein the electronic component is at least one of a battery charging circuit or a power management circuit, or combination thereof.

11. The system of claim 1, wherein the portion of the wearable device that is configured to secure the wearable device to a user is a flexible strap.

12. The system of claim 1, wherein the portion of the wearable device that is configured to secure the wearable device to a user comprises a first curved segment connected to an end of the device body and a second curved segment connected to an opposing end of the device body, wherein the second coil is disposed within the first curved segment and a third coil of the plurality of coils is disposed within the second curved segment.

13. The system of claim 1, wherein the plurality of coils further comprises a third coil disposed on the device body and wherein the first coil and the third coil are disposed on opposing sides of the device body.

14. The system of claim 1, wherein the first coil is disposed on a face of the device body.

15. The system of claim 1, further comprising a plurality of switches electrically connected to the plurality of coils and operative to selectively electrically connect together two or more of the plurality of coils.

16. The system of claim 15, further comprising a controller circuit configured to operate the plurality of switches to selectively electrically connect together two or more of the plurality of coils to adjust a mutual inductance between the plurality of coils and a transmitter coil configured to generate the externally generated magnetic field based on a detected orientation of the wearable device within the externally generated magnetic field.

17. The system of claim 1, wherein the wearable device is a watch, an electronic fitness monitoring device, an electronic bracelet, or an electronic badge.

18. A method to configure a wearable device with a wireless charging system, the method comprising:
selecting a target mutual inductance ($M_{target}$) between a plurality of coils configured to be integrated with the wearable device at a plurality of locations and a transmitter coil configured to generate an externally generated magnetic field;
determining a plurality of placement orientations of the wearable device in the externally generated magnetic field;
determining a total mutual inductance between the plurality of coils and the transmitter coil for each of the plurality of placement orientations;
changing one or more design parameters of the plurality of coils; and
repeating the determining of the total mutual inductance and the changing the one or more design parameters until the total mutual inductance for each of the plurality of placement orientations is within 20% of $M_{target}$.

19. The method of claim 18, wherein determining the total mutual inductance between the plurality of coils and the transmitter coil is based on determining individual mutual inductances between each of the plurality of coils and the transmitter coil for the plurality of placement orientations, and wherein the changing the one or more design parameters is repeated until the individual mutual inductances for a given placement orientation of the wearable device in the externally generated magnetic field have an average of $M_{target}$.

20. The method of claim 18, wherein the repeating of the determining of the total mutual inductance and the changing the one or more design parameters are repeated until the total mutual inductance for each of the plurality of placement orientations is equal to $M_{target}$.

21. A wireless charging system comprising:
a plurality of coils comprising a first coil integrated with a device body of a wearable device and a second coil integrated with a portion of the wearable device that is configured to secure the wearable device to a user; and
a plurality of switches electrically connected to the plurality of coils and operative to selectively connect together the plurality of coils in different combinations,
the plurality of switches operative to electrically connect together the plurality of coils in a first combination comprising the plurality of coils electrically connected together to a first electronic component of the wearable device, the plurality of coils configured to couple to an externally generated magnetic field and provide power to the first electronic component,
the plurality of switches operative to electrically connect together the plurality of coils in a second combination comprising a subset of the plurality of coils electrically connected together to the first electronic component and at least one of the plurality of coils electrically connected to a second electronic component in the wearable device separate from the first electronic component, the subset of the plurality of coils configured to couple to the externally generated magnetic field and provide power to the first electronic component,
wherein the plurality of coils are disposed such that a respective plane of at least one coil is at least partially perpendicular to the externally generated magnetic field responsive to the wearable device being disposed in any orientation at a same location on a charging surface.

22. The system of claim 21, wherein, in the second combination, the subset of the plurality of coils are electrically connected together and configured to couple to the externally generated magnetic field and the at least one of the plurality of coils is configured as a main communication antenna or a diversity communication antenna.

23. The system of claim 22, wherein the main communication antenna or the diversity communication antenna is for at least one of LTE communication, UMTS communication, CDMA communication, GSM communication, WiFi communication, Bluetooth communication, GPS communication, or radio communication, or a combination thereof.

24. The system of claim 21, wherein the at least one of the plurality coils in the second combination is disposed on a face side of the device body and is configured for GPS communication.

25. The system of claim 21, wherein the first electronic component includes a battery charging circuit and the second electronic component includes a communication circuit.

26. The system of claim 21, wherein the first combination comprises at least some of the plurality of coils electrically connected together in series or in parallel, or a combination thereof.

27. The system of claim 21, wherein the second combination further comprises another one of the plurality of coils electrically connected to a third electronic component in the wearable device.

28. The system of claim 27, wherein the at least one of the plurality coils is configured as a main communications antenna, wherein the another one of the plurality of coils is configured as a diversity communications antenna.

29. A wireless charging system for a wearable device, the wireless charging system comprising:

a plurality of coils disposed on or within different surfaces of the wearable device, wherein at least two of the surfaces are oriented on different planes, wherein the plurality of coils are configured to couple to an externally generated magnetic field and provide power to an electronic component in the wearable device, and wherein the plurality of coils are configured such that a first mutual inductance induced between the plurality of coils and a transmitter coil responsive to the wearable device being in a respective first orientation is within 20% of a second mutual inductance induced between the plurality of the coils and the transmitter coil responsive to the wearable device being disposed in any second orientation at the same location on the charging surface.

30. The system of claim 29, further comprising switching circuitry connected to the plurality of coils and configured to selectively connect together different coils of the plurality of coils when the wearable device is in different orientations within the externally generated magnetic field.

* * * * *